Aug. 28, 1934.  H. W. TUTTLE  1,971,546
APPARATUS FOR EXPRESSING JUICE FROM FRUIT
Filed June 12, 1931
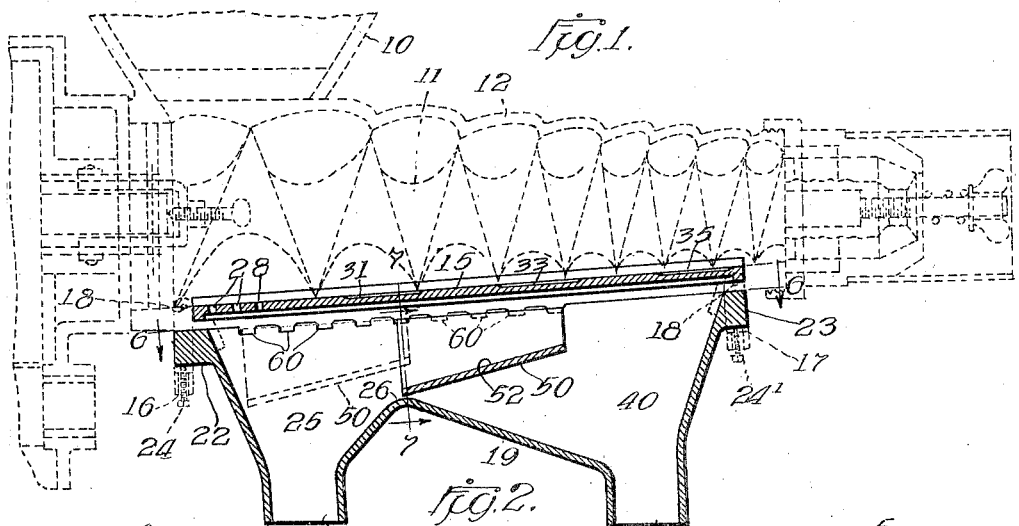
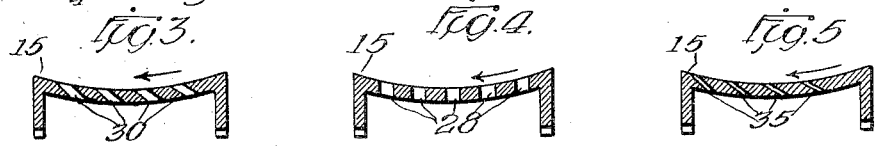
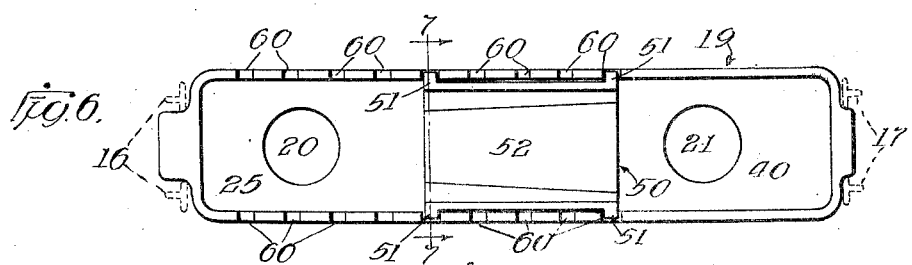
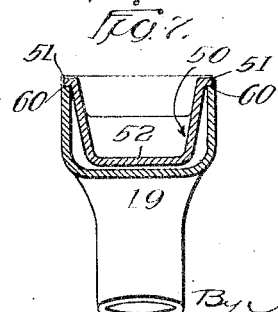
Witnesses:
Harry R. L. White
Robert Cremer
Inventor
Henry W. Tuttle
By Arthur L. Sprinkle
atty.

Patented Aug. 28, 1934

1,971,546

UNITED STATES PATENT OFFICE

1,971,546

APPARATUS FOR EXPRESSING JUICE FROM FRUIT

Henry W. Tuttle, Chicago, Ill.

Application June 12, 1931, Serial No. 543,986

1 Claim. (Cl. 100—48)

The invention relates to improvements in presses for expressing juices from fruits and other analogous compressible materials as meat and the like, where the mass of material is capable of being compressed or condensed in bulk in order to free the contained juices therefrom, and the novel features of the invention pertain more particularly to the construction of a new and improved type of juice strainer or screen adapted for use in compressing machines of the rotating screw type as shown, for example, in my United States Patent 1,902,738 of March 21st, 1933.

My invention is particularly directed to the construction of a strainer of a type adapted to be used in the bottom of a screw casing of a construction adapted for co-operating with a compressing screw device that is designed to compress fruits and analogous materials by reason of a gradually decreasing cross-sectional area of the core of material being acted upon from the intake or feed end of the screw casing toward the discharge end thereof and the primary object of the present invention is to improve the construction of the strainer to give it the highest degree of efficiency in co-operating with the screw compressing machine to enable the compressor to function with the highest degree of efficiency under control of the operator in extracting, particularly, fruit juices of any desired degree of density with respect to the inclusion or separation of solid particles or pulpy material in the fruit that may accompany the liquid juice under varying degrees of pressure during the operation of the machine thereupon from the delivery to the discharge end thereof.

A further object of the invention is to provide a new and improved construction of juice strainer and separator for fruit presses having improved controllable or adjustable means for separating liquid and pulpy discharges from the press and directing the same to different discharge orifices co-operating with the strainer and juice separating and density controlling device.

Other objects of the invention will appear from the following description which is directed to the preferred embodiment thereof as shown in the drawing and described in the following specification, the novel features of the invention being set forth in the appended claim.

In the said drawing:

Fig. 1 is a longitudinal sectional view through my improved juice strainer device, the view showing the apparatus in its normal position attached to a fruit juice compressing machine of the type heretofore referred to, the outlines of the machine proper being illustrated as a longitudinal sectional view in dotted outline.

Fig. 2 is a top plan view of my improved detachable strainer plate.

Figs. 3, 4 and 5 are transverse sectional views taken on the lines 3—3, 4—4 and 5—5 respectively of Fig. 2, looking in the direction indicated by the arrows.

Fig. 6 is a top plan view of the juice collecting, separating and discharging device, the view being taken approximately on the line 6—6 of Fig. 1 looking downwardly.

Fig. 7 is a vertical sectional view on the line 7—7 looking in the direction indicated by the arrows and showing in section also the adjustable juice and pulp separating plate.

While my improved juice strainer and separator or skimmer is primarily intended for use with a press of the form shown in my aforesaid application for patent and as illustrated by the dotted outline drawing in Fig. 1, the invention has a wider usage and may be adapted for use in many forms of screw presses, particularly with respect to the skimmer or separator device.

In the form of press illustrated in dotted outline in Fig. 1, the reference character 10 designates the hopper into which fruit such as grapes, oranges or other materials may be fed to the machine casing or compression chamber 12 in which the screw 11 is rotatably mounted.

A longitudinal opening or slot of some width is provided along the lowermost side of the casing 12 for the reception of the strainer member designated generally by the reference character 15 (Figs. 1 and 2).

In a machine of this character, power in some form as by crank or operating wheel, not shown, is applied to rotate the screw and when the fruit or other pulpy material to be squeezed is introduced into the machine through the hopper, the material, by rotation of the screw and the co-operating grooves on the inside of the casing 12, will pass longitudinally of the casing from the hopper end to the discharge end in a circular direction following the grooves in the casing and in so doing will pass over the strainer plate 15 in a circular direction, in a manner more clearly pointed out in my aforesaid patent, in planes substantially at right angles to the longitudinal axis of the screw and the co-operating casing.

The grooves illustrated on the inside of the casing 12 are of spiral formation, the rotation of the spiral being preferably in one direction while the grooves on the screw are in spiral form rotating in the opposite direction, both grooves being formed at about the same pitch, from which it follows that the pitch of the normal movement of the material may be about one-half the normal pitch of the rotating screw 11, thus causing the material to traverse in the form of an irregular core from side to side of the strainer plate 15 almost at right angles to the longitudinal axis of the screw and the said plate.

The juice collector casing is detachably clamped to the bottom of the casing 12 preferably by means of two U-shaped members 16, 17, that will have their upwardly extending branches pivotally connected, as designated by reference character 18, to the body of the casing 12 at the ends of the strainer slot.

An important feature of my invention is this detachable collector casing designated generally by the reference character 19 which is formed of an irregular shaped casting or casing having the respective separated discharge outlets 20, 21, this collector having at the respective ends thereof projections 22, 23 adapted to be engaged by the clevis-like pivoted members 16 and 17 by which the juice collector will be detachably held upon the lower side of the casing 12 in clamping position upon the screw casing member 12, there being threaded screws 24, 24' provided in these clamping devices for engagement with the aforesaid locking extensions 22, 23 on the juice collector.

A discharge outlet 20 in the juice collector casing 19 communicates with a funnel-like integral part of the juice collector designated generally by reference character 25, the inside wall of which, as indicated at 26, extends upwardly well toward the top of the juice collector to provide a baffle or division point for gravity separation of liquids falling within the juice collector. The division point 26 in the juice collector casing will lie well toward that end of the juice collector casing which is underneath the hopper of the machine and underneath the hopper end of the strainer plate 15 which latter is provided at the end thereof underlying the hopper with a plurality of enlarged openings designated by reference character 28 designed to permit the free passage of juice coming from the fruit upon the initial crushing or compressing action of the screw at the end thereof immediately beneath the hopper. It will be apparent that ordinarily the first action of the compressing device upon the fruit or other material, will be to cause a pure juice to be extracted with very little, if any, admixture of pulpy materials.

In the present embodiment of my invention, I have also greatly improved the operation of the strainer plate 15 by forming the respective series of parallel longitudinally extending slots 30 to 35 inclusive so that the first series of slots 30 adjacent the comparatively large juice holes 28 will be comparatively wide to permit extracted juice in maximum quantities to flow not only through the commodious apertures 28 provided but through the slots 30 as well, upon the initial impact of the screw and the casing with the material being acted upon below the hopper orifice. The slots 30 to 35 inclusive will also be angularly cut in the manner clearly set forth in my aforesaid pending application and the rotation of the screw, with respect to the angularity of these slots 30 to 35 inclusive, will be in the direction of the arrow as illustrated in Figs. 3 to 5 inclusive resulting in a construction which permits the core of compressible material being acted upon within the casing to pass freely over the strainer plate 15 without a tendency for solid portions thereof to be sliced off and deflected into the various longitudinal openings 30 to 35 inclusive in the strainer plate.

The succeeding slots 31 will be made narrower, as illustrated in the drawing, than the initial longitudinal slots 30 and in a like manner each successive series of solts 32 to 35 inclusive will be narrowed with respect to their interior width to the discharge end of the strainer plate, the angularity of the slots, however, remaining the same in each series as illustrated in the drawing.

In compressing pulpy fruit products such as oranges, grapes and the like, I find this relative graduation from maximum to minimum of the juice slots in the plate 15 to be of the greatest importance in securing efficient and satisfactory results because when the oranges or other fruit materials are first encountered by the screw 11 immediately below the hopper, the compression tendency on the same is not sufficiently great to tend to force the pulpy portions of the product through either the comparatively large holes 28 or the comparatively wide slots 30, 31 below the hopper end of the machine. It is at the end of the machine immediately below the hopper that most of the pure juice is extracted upon the initial compressing action of the screw and the casing thereupon and particularly in compressing oranges, I find that the high point or baffle 26 in the juice collector 19 may be located about as illustrated in Fig. 1 to determine the proper point of separation of pure juice being extracted from fruit like oranges which, passing through the orifices 28 and the initial longitudinal slots 30 in the strainer plate with possibly some juice from the second series of slots 31, will drop into the collector 25 and be discharged below into a suitable receptacle through the discharge orifice 20, while all the other juice and pulpy materials that may be squeezed out of the spiral core as it passes longitudinally from the hopper end to the discharge end of the casing, will normally strike the bottom portion of the juice collector towards the discharge end thereof so that such materials even to the extreme discharge end of the casing 12, will pass downwardly into the hopper 40 and be discharged through the orifice 21.

Another important feature of my invention resides in the provision of an adjustable separator or skimmer device which is designated generally by the reference character 50, the same being in the form of a trough that is U-shaped in cross section, as shown in Figs. 1, 6 and 7.

The upper peripheral edges of the juice collector casing on the two opposite sides thereof are provided for a considerable portion of their length with a plurality of spaced transverse indentations or notches 60 and the trough-like juice separator or skimmer device 50 is provided at each of its four corners along its upper side edges with the laterally projecting lugs or fingers 51 designed to co-operate with a selected number of the spaced-apart notches 60 in the manner illustrated most clearly in Figs. 1, 6 and 7 so that the skimmer device 50 is thus capable of longitudinal adjustment in relation to the juice collector casing 19 within the limits illustrated, for example, in Fig. 1 by the full line and the dotted line portions of the shiftable part 50, the full line position thereof indicating the extreme adjustment of the skimmer device toward the right hand end of the juice collector casing as it appears in Fig. 1, while the dotted line position of the same part indicates its position of extreme adjustment toward the left hand end of the machine and the juice collector casing as it also appears in Fig. 1.

It will furthermore be seen that the spaced notches 60 will provide means for a series of intermediate adjustments of the skimmer device 50 between the limits of the full line and dotted line positions as shown in Fig. 1.

Furthermore it should be noted that the integral bottom member 52 of the skimmer device 50 is formed at a decided inclination to the approximately horizontal position of the upper edge of the juice collector casing 19 and the slotted strainer member 15 so that all juice and liquid or semi-liquid materials passing through the variously described perforations and slots that may be above the skimmer or separator device 50 on striking the bottom plate 52 and the sides of the skimmer device 50, will be conducted toward the discharge end of the skimmer device 50 as it appears in the left end thereof in Fig. 1 from which it will be seen that the device 50 may be adjusted longitudinally of the juice collecting casing 19 for the purpose of separating the discharge of liquid and semi-liquid materials passing downwardly through the strainer plate 15 in a manner to be pre-determined by the operator who will adjust the skimmer or separator device 50 according to the conditions to be desired in the character of the materials discharged from the respective orifices 20, 21 of the juice collector and skimmer. For example, in the operation of the machine, if it should be desired to secure a fruit juice from fruit materials as oranges, and the like, that shall be comparatively free from as much pulpy or solid material as possible, the skimmer or separator device 50 may be entirely removed from the juice collector casing 19 with the result that the juice on the initial compressing action of the screw below the hopper and in that portion of the casing adjacent thereto in passing downwardly through the comparatively large holes 28 at the left hand end of the strainer plate, as well as through the comparatively wide slots 30 adjacent thereto, will be discharged downwardly and separated by the baffle or elevated portion 26 and caused to be discharged into the funnel portion 25 of the juice collector casing 19 so as to be discharged as comparatively free, pure juice through the discharge nozzle 20.

If, on the other hand, the skimmer or separator device 50 be adjusted in the notches before assembling and clamping the juice collector upon the underside of the casing, substantially the same result will be secured as it will be seen that the juice passing downwardly through the strainer slots 28 and 30 will be intercepted by the skimmer device 50 and discharged toward the left hand end of the juice collector casing as it appears in Fig. 1 into the discharge funnel 25 terminating in the juice discharge nozzle 20. If, however, the character of the oranges or other fruit being compressed and the conditions under which the juice is to be used will permit of a juice containing varying quantities of pulpy or solid particles, then the separator or skimmer device 50 may be adjusted along the successive notches 60 toward the right or discharge end of the machine as it appears in Fig. 1 throughout a range of four additional positions provided by the spaced notches 60 as illustrated in the drawing, the preferred extreme limit of adjustment of the separator or skimmer device 50 being the full line position illustrated in Fig. 1 where the lower and discharge portion at the left hand end of the skimmer 50 as it appears in Fig. 1 is immediately above the high point or juice separating point in the bottom wall of the juice collector as designated generally by the reference character 26.

With the skimmer device 50 in the full line position as illustrated in Fig. 1, it will be seen that all of the discharge from the slots in the strainer plate 15 above the skimmer 50 in this position, as well as above the funnel compartment 25 of the juice collector, will be conducted through the juice spout 20 from the machine. This extreme adjustment of the separator or skimmer device obviously results in conducting a considerable amount of the pulpy materials that will be discharged through the slots of the strainer device 15 as the process of compression continues in the passage of material under compression toward the discharge end of the machine from the part adjacent the feed hopper end thereof.

In this connection, it will be understood that in a juice extracting machine of the character herein described, the core of pulpy material as it passes from the hopper end of the casing 12 toward the discharge end thereof, will be gradually contracted in its cross sectional area to such an extent that after the materials have passed longitudinally of the casing toward the discharge end thereof beyond approximately the high point or dividing point 26 on the bottom of the juice collector casing 19, there will result a sufficient degree of compression so that some plastic and semi-plastic ingredients of the oranges or fruits will be forced through the succession of longitudinal slots 31 to 35 inclusive notwithstanding the fact that as described they are preferably gradually contracted or narrowed in width from the feed end of the strainer plate 15. This will also be true of oils and some of the pulpy materials that are found in the rinds or skins of oranges and other fruits and it will be seen that the range of adjustment provided for the separator or skimmer device 50 in the employment of the spaced apart slots 60 will enable the operator by the adjustment of the skimmer device to control the character of the juice to be discharged through the juice spout 20 of the collector with any substantial degree of selection that may be desired from a comparatively thin juice free of solids and oils to a juice containing such quantities of pulpy materials as may be desired.

In a machine for expressing juices from fruits to which I have shown the invention applied, provision is made for controlling the discharge outlet at the extreme discharge end of the casing so that much pulpy material may be forced through the slotted strainer plate 15 adjacent the discharge end of the machine resulting in a discharge of some plastic and pulpy materials into the funnel 40 and passing outwardly through the discharge outlet 21 that may not be adaptable for use as commercial products.

On the other hand my adjustable skimmer device and juice collector compartment may be utilized in the manner described for the production of a comparatively free, pure juice and a heavier, thicker fruit extract containing much pulpy or plastic material that may be separately handled and used for various purposes or for intermingling with water and the pure juice in the preparation and manufacture of various fruit juice products such as beverages and the like.

If, on the other hand, as before suggested, no separation of the juice and other expressed materials from the pulp is desired, the separator or strainer 50 may be entirely removed or positioned in the dotted line position as illustrated in Fig. 1 and the resulting products from the discharge spouts 20, 21 mixed or intermingled upon coming from the machine as may be desired due to the capability of a fruit juice extracting machine of the character described to gradually force the pulpy materials of the fruit to a high degree of compression adjacent the discharge end of the casing, I have found that the provision of the gradually decreasing width of the slots from the hopper end to the discharge end of the strainer plate 15 as exemplified in the described groups of slots 30 to 35 inclusive, to be of the utmost importance in fruit juice expressing machines to secure the desired control with respect to the resulting products extracted from the pulp while the provision of my improved adjustable skimmer or separator device 50 in conjunction with the double discharge juice collector casing 19, will enable the operator to control the extraction process and the resulting products from substantially all fruit products to a degree not heretofore attainable in machines of this character.

In order that the invention might be understood, the details of the preferred embodiment thereof have been described with particularity but it is not desired to be limited to the precise details except as set forth in the appended claim.

I claim:

The combination with a juice extracting machine comprising an elongated casing and a rotatable compressing screw mounted therein, there being an elongated discharge slot in said casing, of an elongated detachable juice separator adapted to be secured adjacent the said discharge slot, the said separator being in the form of an open top casing with two angularly related sheds at the bottom thereof leading to separated discharge outlets, there being a plurality of spaced-apart slots in the respective opposite, longitudinal side walls of the separator casing, and an auxiliary separating device in the form of a trough having an angularly extending bottom with substantially parallel vertically extending sides and equipped with laterally extending lugs adapted to co-operate with the aforesaid spaced-apart slots in the longitudinal walls of the casing of the separator.

HENRY W. TUTTLE.